United States Patent
Lohwasser et al.

(10) Patent No.: US 10,731,035 B2
(45) Date of Patent: Aug. 4, 2020

(54) IMPACT MODIFIER BASED ON POLYISOBUTANE FOR POLYAMIDES

(71) Applicant: BASF SE, Ludwigshafen am Rhein (DE)

(72) Inventors: Ruth Lohwasser, Ludwigshafen (DE); Natalie Beatrice Janine Herle, Ludwigshafen (DE); Rosa Corberan Roc, Ludwigshafen (DE); Axel Hust, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 37 days.

(21) Appl. No.: 16/307,723

(22) PCT Filed: Jun. 8, 2017

(86) PCT No.: PCT/EP2017/063912
§ 371 (c)(1),
(2) Date: Dec. 6, 2018

(87) PCT Pub. No.: WO2017/216023
PCT Pub. Date: Dec. 21, 2017

(65) Prior Publication Data
US 2019/0264029 A1     Aug. 29, 2019

(30) Foreign Application Priority Data

Jun. 15, 2016  (EP) ................... 16174502

(51) Int. Cl.
| | |
|---|---|
| C08L 77/00 | (2006.01) |
| C08L 23/22 | (2006.01) |
| C08L 77/06 | (2006.01) |
| B29C 45/00 | (2006.01) |
| C08L 35/00 | (2006.01) |
| C08L 77/02 | (2006.01) |
| B29K 77/00 | (2006.01) |

(52) U.S. Cl.
CPC .......... *C08L 77/06* (2013.01); *B29C 45/0001* (2013.01); *C08L 23/22* (2013.01); *C08L 35/00* (2013.01); *C08L 77/00* (2013.01); *C08L 77/02* (2013.01); *B29K 2077/00* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 4,360,617 A | 11/1982 | Muller et al. | |
| 5,883,196 A | 3/1999 | Rath et al. | |
| 2014/0309371 A1* | 10/2014 | Ellul | C08L 23/02 525/63 |
| 2016/0032091 A1 | 2/2016 | Ellul et al. | |

FOREIGN PATENT DOCUMENTS

| | | |
|---|---|---|
| DE | 2702604 A1 | 7/1978 |
| DE | 10313681 A1 | 10/2004 |
| EP | 0031236 A2 | 7/1981 |
| EP | 38094 A2 | 10/1981 |
| EP | 38582 A2 | 10/1981 |
| EP | 39524 A1 | 11/1981 |
| EP | 129195 A2 | 12/1984 |
| EP | 129196 A2 | 12/1984 |
| EP | 156310 A2 | 10/1985 |
| EP | 299444 A2 | 1/1989 |
| EP | 922065 A2 | 6/1999 |
| EP | 1198491 A1 | 4/2002 |
| EP | 1994075 A2 | 11/2008 |
| WO | WO-94/12575 A1 | 6/1994 |
| WO | WO-02/062895 A1 | 8/2002 |
| WO | WO-2012/072643 A2 | 6/2012 |

OTHER PUBLICATIONS

Guo et al., Synthesis of highly reactive polyisobutylenes with exo-olefin terminals via controlled cationic polymerization with H2O/FeCl3/iPrOH initiating system in nonpolar hydrocarbon media, J. Polymer Scie, Part A: Polymer Sci., 51(19):4200-12 (Oct. 2013).
International Application No. PCT/EP2017/063912, International Search Report, dated Sep. 8, 2017.
Van der Sanden et al., Impact improvement of polyamide-6/rubber blends via controlled degradation of the dispersed phase, using electron beam irradiation, IN: Lemstra et al. (eds.), Integration of Fundamental Polymer Science and Technology-5, Elsevier Science Publishers Ltd., pp. 66-71 (1991).

* cited by examiner

*Primary Examiner* — David J Buttner
(74) *Attorney, Agent, or Firm* — Marshall, Gerstein & Borun LLP

(57) ABSTRACT

A thermoplastic molding composition containing
  A) 20 to 99.9 wt % of a thermoplastic polyamide,
  B) 0.1 to 40 wt % of an alkenylsuccinic acid derivative obtained by reaction of polyiso-butene (B1) having a number-average molecular weight Mn of 10,000 to 50,000 at temperatures of 180° C. to 250° C. with maleic acid or derivatives thereof (B2) in a stoichiometric ratio of at least 2 equivalents of $\alpha,\beta$-unsaturated mono- and dicarboxylic acid or derivatives thereof (B2) per reactive double bond in the polyisobutene (B1) for a duration of at least 15 minutes to 10 hours and up to 10 bar of positive pressure, wherein the derivatives are anhydrides, mono- or dialkyl esters, and mixed esters, and wherein the reactive double bonds are the sum total of the terminal $\alpha$- and $\beta$-double bonds in the polyisobutene (B1), and
  C) 0 to 60 wt % of further additives,
wherein the weight percentages for the components A) to C) sum to 100%.

11 Claims, No Drawings

IMPACT MODIFIER BASED ON POLYISOBUTANE FOR POLYAMIDES

CROSS-REFERENCE TO RELATED APPLICATIONS

This is a U.S. national phase of International Application No. PCT/EP2017/063912, filed Jun. 8, 2017, which claims the benefit of European Patent Application No. 16174502.1, filed Jun. 15, 2016.

The invention relates to thermoplastic molding compositions comprising
- A) 20 to 99.9 wt % of a thermoplastic polyamide,
- B) 0.1 to 40 wt % of an alkenylsuccinic acid derivative obtainable by reaction of polyiso-butene (B1) having a number-average molecular weight $M_n$ of 10 000 to 50 000 at temperatures of 180° C. to 250° C. with maleic acid or derivatives thereof (B2) in a stoichiometric ratio of at least 2 equivalents of maleic acid or derivatives thereof (B2) per reactive double bond in the polyisobutene (B1) for a duration of at least 15 minutes to 10 hours and up to 10 bar of positive pressure, wherein the derivatives are selected from the group consisting of anhydrides, mono- or dialkyl esters and mixed esters and wherein the reactive double bonds are the sum total of the terminal $\alpha$- and $\beta$-double bonds in the polyisobutene (B1),
- C) 0 to 60 wt % of further additives, wherein the weight percentages for the components A) to C) sum to 100%.

The invention further relates to the use of the molding compositions according to the invention for producing molded articles of any type and to the molded articles thus obtainable.

On account of their structure and their ability to form intermolecular hydrogen bridging bonds, semicrystalline polyamides have good mechanical properties, in particular impact strength, and a good heat resistance. On account of their hygroscopic polar nature, polyamides absorb water which has a negative effect on mechanics, in particular tensile strength and stiffness.

In contrast to polyamide, amorphous polyisobutylene (PIB) is very hydrophobic and on account of its low glass transition temperature exhibits a high flexibility even at low temperatures. Due to its amorphous tacky character it is not suitable for applications requiring mechanical strength.

In order to combine the complementary properties of different polymers without losing the good mechanical properties of the one blend partner, polymer blends are compatibilized with suitable reagents.

For olefins such as for example polyethylene PE or polypropylene PP, maleic anhydride-grafted PEs or PPs are often used for compatibilization. These compatibilizers are formed by a radical formation along the chain and subsequent functionalization, so that a plurality of maleic anhydride groups are located along the chain. Compared to these polyolefins, polyisobutylene is very oxidation-stable and functionalization by grafting along the chain is possible only with difficulty. As a result there have hitherto been only a few blend systems comprising polyisobutylene homopolymers. A publication from the University of Eindhoven (M. C. M. van der Sanden, J. G. M. van Gisbergen, I. D. Tauber, H. E. H. Meijer, P. J. Lemstra, Integration of Fundamental Polymer Science and Technology 5 pp 66-71) describes the attempt to functionalize a high molecular weight PIB with maleic anhydride (MA) by means of a masterbatch of polypropylene with MA and a masterbatch of a radical-former. Since functionalization of PIB by free-radical means is scarcely possible, compatibilization is low and results in a poor mechanical profile.

WO 02/062895 A1 describes a method in which PIB homo- or copolymers are functionalized initially with isocyanates and subsequently with lactam or amide in order to function as a compatibilizer for polyamide. Polyamide, polyisobutylenes and the compatibilizer were then mixed in a Brabender kneader in a further step. Compatibilization is carried out partially in the presence of a tin compound.

The method is very complicated and the remaining metal complexes also have a disadvantageous effect on the properties of polyamides (color, decomposition etc.).

DE-A-2702604 discloses reacting polyisobutenes having a degree of polymerization of up to 100 with maleic anhydride to afford succinic acid derivatives with stoichiometric or slightly superstoichiometric amounts of maleic anhydride. This corresponds to a molecular weight of the polyisobutene of about 5600 g/mol.

WO 12/072643 mentions reacting polyisobutenes having a number-average molecular weight $M_n$ of up to 5000 g/mol with maleic anhydride to afford succinic acid derivatives.

The present invention accordingly has for its object to improve the mechanical properties of polyamides at low temperature and at room temperature. Surprisingly, the impact strength in particular is significantly increased by addition of the component B) according to the invention and the hydrophobization of the polyamides (in particular at the surface of moldings) is improved. The flowability during processing and the heat ageing resistance (HAR) are likewise improved. The optical properties (clarity, haze) are also better despite the addition of an impact modifier.

The molding compositions defined in the introduction have accordingly been found. Preferred embodiments are set out in the subsidiary claims.

As component A) the molding compositions according to the invention comprise 20 to 99.9, preferably 30 to 99.5 and in particular 30 to 80 wt % of at least one polyamide, wherein semicrystalline polyamides are preferred.

The polyamides of the molding compositions according to the invention generally have an intrinsic viscosity of 79.9 to 350, preferably 110 to 240, ml/g determined in a 0.5 wt % solution in 96 wt % sulfuric acid at 25° C. according to ISO 307.

Preference is given to semicrystalline or amorphous resins having a molecular weight (weight average) of at least 5000, such as are described in U.S. Pat. Nos. 2,071,250, 2,071,251, 2,130,523, 2,130,948, 2,241,322, 2,312,966, 2,512,606 and 3,393,210 for example.

Examples thereof are polyamides which derive from lactams having 7 to 13 ring members, for example polycaprolactam, polycaprylolactam and polylaurolactam, and also polyamides which are obtained via reaction of dicarboxylic acids with diamines.

Employable dicarboxylic acids include alkanedicarboxylic acids having 6 to 12 carbon atoms, in particular 6 to 10 carbon atoms, and aromatic dicarboxylic acids. These include the acids adipic acid, azelaic acid, sebacic acid, dodecanedioic acid and terephthalic and/or isophthalic acid.

Particularly suitable diamines are alkanediamines having 6 to 12 carbon atoms, in particular 6 to 8 carbon atoms, and also m-xylylenediamine (e.g. Ultramid® X17 from BASF SE, a 1:1 molar ratio of MXDA to adipic acid), di(4-aminophenyl)methane, di(4-aminocyclohexyl)methane, 2,2-di(4-aminophenyl)propane, 2,2-di(4-am inocyclohexyl)propane or 1,5-diamino-2-methylpentane.

Preferred polyamides are polyhexamethylene adipamide, polyhexamethylene sebacamide and polycaprolactam and also 6/66 copolyamides, especially having a proportion of 5 to 95 wt % of caprolactam units (for example Ultramid® C31 from BASF SE).

Suitable polyamides further include those obtainable from w-aminoalkyl nitriles, for example aminocapronitrile (PA 6) and adipodinitrile with hexamethylenediamine (PA 66) by so-called direct polymerization in the presence of water, as described for example in DE-A 10313681, EP-A 1198491 and EP 922065.

Also included are polyamides obtainable for example by condensation of 1,4-diaminobutane with adipic acid at elevated temperature (polyamide 4,6). Production processes for polyamides having this structure are described for example in EP-A 38 094, EP-A 38 582 and EP-A 39 524. Also suitable are polyamides obtainable by copolymerization of two or more of the above-mentioned monomers or mixtures of a plurality of polyamides in any desired mixing ratio. Particular preference is given to mixtures of polyamide 66 with other polyamides, in particular 6/66 copolyamides.

Semiaromatic copolyamides such as PA 6/6T and PA 66/6T having a triamine content of less than 0.5, preferably less than 0.3, wt % (see EP-A 299 444) have also proven particularly advantageous. Further high-temperature-resistant polyamides are disclosed in EP-A 19 94 075 (PA 6T/6I/MXD6).

Production of the preferred semiaromatic copolyamides having a low triamine content may be carried out by the processes described in EP-A 129 195 and 129 196.

The following nonexhaustive list comprises the recited polyamides and other polyamides A) in the context of the invention and also the monomers present.

AB Polymers:

| | |
|---|---|
| PA 4 | pyrrolidone |
| PA 6 | ε-caprolactam |
| PA 7 | ethanolactam |
| PA 8 | capryllactam |
| PA 9 | 9-aminopelargonic acid |
| PA 11 | 11-aminoundecanoic acid |
| PA 12 | laurolactam |
| AA/BB polymers | |
| PA 46 | tetramethylenediamine, adipic acid |
| PA 66 | hexamethylenediamine, adipic acid |
| PA 69 | hexamethylenediamine, azelaic acid |
| PA 610 | hexamethylenediamine, sebacic acid |
| PA 612 | hexamethylenediamine, decanedicarboxylic acid |
| PA 613 | hexamethylenediamine, undecanedicarboxylic acid |
| PA 1212 | 1,12-dodecanediamine, decanedicarboxylic acid |
| PA 1313 | 1,13-diaminotridecane, undecanedicarboxylic acid |
| PA 6T | hexamethylenediamine, terephthalic acid |
| PA 9T | 1,9-nonanediamine, terephthalic acid |
| PA MXD6 | m-xylylenediamine, adipic acid |
| PA 6I | hexamethylenediamine, isophthalic acid |
| PA 6-3-T | trimethylhexamethylenediamine, terephthalic acid |
| PA 6/6T | (see PA 6 and PA 6T) |
| PA 6/66 | (see PA 6 and PA 66) |
| PA 6/12 | (see PA 6 and PA 12) |
| PA 66/6/610 | (see PA 66, PA 6 and PA 610) |
| PA 6I/6T | (see PA 6I and PA 6T) |
| PA PACM 12 | diaminodicyclohexylmethane, laurolactam |
| PA 6I/6T/PACM | such as PA 6I/6T + diaminodicyclohexylmethane |
| PA 12/MACMI | laurolactam, dimethyldiaminodicyclohexylmethane, isophthalic acid |
| PA 12/MACMT | laurolactam, dimethyldiaminodicyclohexylmethane, terephthalic acid |
| PA PDA-T | phenylenediamine, terephthalic acid |

As component B) the molding compositions according to the invention comprise 0.1% to 40%, preferably 0.5% to 25% and in particular 2% to 22%, by weight of an alkenylsuccinic acid derivative obtainable by reaction of polyisobutene (B1) having a number-average molecular weight $M_n$ of 10 000 to 50 000 at temperatures of 180° C. to 250° C. with maleic acid or derivatives thereof (B2) in a stoichiometric ratio of at least 2 equivalents of maleic acid or derivatives thereof (B2) per reactive double bond in the polyisobutene (B1), preferably more than 2 equivalents, particularly preferably at least 2.5 equivalents, very particularly preferably at least 3 equivalents, in particular at least 3.5 equivalents and especially at least 4 equivalents of maleic acid or derivatives thereof per reactive double bond in the polyisobutene (B1), for a duration of at least 15 minutes to 10 hours and up to 10 bar of positive pressure, wherein the derivatives are selected from the group consisting of anhydrides, mono- or dialkyl esters and mixed esters and wherein the reactive double bonds are the sum total of the terminal α- and β-double bonds in the polyisobutene (B1).

As a result of the process according to the invention succinic acid derivatives of polyisobutene having a number-average molecular weight $M_n$ of 10 000 to 50 000 are obtainable for the first time.

The term "succinic acid derivatives of polyisobutene" is to be understood as meaning not only the reaction products of polyisobutene with maleic acid and derivatives thereof in the narrower sense but also in the wider sense products that are obtained therefrom or are obtainable from the reaction of polyisobutene with α,β-unsaturated monocarboxylic acids or derivatives thereof or α,β-unsaturated dicarboxylic acids or derivatives thereof other than maleic acid since the monocarboxylic acids are often obtainable from the dicarboxylic acids by decarboxylation for example.

The polymer (A) employable in the process according to the invention is selected from isobutene homopolymers or isobutene-comprising copolymers here referred to collectively by the term "polyisobutene" and obtainable from the respective monomer mixtures as follows:

For use of isobutene or an isobutene-comprising monomer mixture as monomer to be polymerized, suitable isobutene sources include not only pure isobutene but also isobutene-containing $C_4$ hydrocarbon streams, for example $C_4$ raffinates, especially "raffinate 1", $C_4$ cuts from isobutane dehydrogenation, $C_4$ cuts from steamcrackers and from FCC crackers (fluid catalyzed cracking) provided that they have been substantially freed of 1,3-butadiene present therein. A $C_4$ hydrocarbon stream from an FCC refinery unit is also known as a "b/b" stream. Further suitable isobutene-containing $C_4$ hydrocarbon streams are, for example, the product stream of a propylene-isobutane cooxidation or the product stream from a metathesis unit, where these are generally employed after customary purification and/or concentration. Suitable $C_4$ hydrocarbon streams generally comprise less than 500 ppm, preferably less than 200 ppm, of butadiene. The presence of 1-butene and of cis- and trans-2-butene is largely non-critical. The isobutene concentration in the recited $C_4$ hydrocarbon streams is typically in the range from 40 to 60 wt %. Thus, raffinate 1 generally consists essentially of 30 to 50 wt % of isobutene, 10 to 50 wt % of 1-butene, 10 to 40 wt % of cis- and trans-2-butene and 2 to 35 wt % of butanes; in the subsequent polymerization process the unbranched butenes in the raffinate 1 are generally practically inert and only the isobutene is polymerized.

In a preferred embodiment the monomer source used for the polymerization is a technical $C_4$ hydrocarbon stream having an isobutene content of 1 to 100 wt %, in particular of 1 to 99 wt %, especially of 1 to 90 wt %, particularly preferably of 30 to 60 wt %, in particular a raffinate 1 stream, a b/b stream from an FCC refinery unit, a product stream from a propylene-isobutane cooxidation or a product stream from a metathesis unit.

Particularly when using a raffinate 1 stream as the isobutene source the use of water as the sole initiator or as a further initiator has proven useful, especially when polymerization is effected at temperatures of −20° C. to +30° C., particularly of 0° C. to +20° C. However, at temperatures of −20° C. to +30° C., in particular of 0° C. to +20° C., it is possible to eschew the use of an initiator when using a raffinate 1 stream as the isobutene source.

The recited isobutene-containing monomer mixture may comprise small amounts of contaminants such as water, carboxylic acids or mineral acids without causing any critical yield or selectivity losses. It is useful to avoid accumulation of these impurities by removing such harmful substances from the isobutene-containing monomer mixture, for example, by adsorption on solid adsorbents such as activated carbon, molecular sieves or ion exchangers.

It is also possible to react monomer mixtures of isobutene/ of the isobutene-containing hydrocarbon mixture with olefinically unsaturated monomers copolymerizable with isobutene. If monomer mixtures of isobutene with suitable comonomers are to be copolymerized the monomer mixture preferably comprises at least 5 wt %, particularly preferably at least 10 wt % and in particular at least 20 wt % of isobutene and preferably at most 95 wt %, particularly preferably at most 90 wt % and in particular at most 80 wt % of comonomers.

Contemplated copolymerizable monomers include: vinylaromatics such as styrene and α-methylstyrene, $C_1$- to $C_4$-alkylstyrenes such as 2-, 3- and 4-methylstyrene and 4-tert-butylstyrene, halostyrenes such as 2-, 3- and 4-chlorostyrene and isoolefins having 5 to 10 carbon atoms, such as 2-methylbut-1-ene, 2-methylpent-1-ene, 2-methylhex-1-ene, 2-ethylpent-1-ene, 2-ethylhex-1-ene and 2-propylhept-1-ene. Contemplated comonomers further include olefins comprising a silyl group, such as 1-trimethoxysilylethene, 1-(trimethoxysilyl)propene, 1-(trimethoxysilyl)-2-methylprop-2-ene, 1-[tri(methoxyethoxy)silyl]ethene, 1-[tri(methoxyethoxy)silyl]propene, and 1-[tri(methoxyethoxy)silyl]-2-methylprop-2-ene. Contemplated comonomers further include—depending on the polymerization conditions—isoprene, 1-butene and cis- and trans-2-butene.

The process can be configured so as to preferentially form random polymers or preferably block copolymers. To produce block copolymers the different monomers may for example be supplied to the polymerization reaction sequentially, the addition of the second comonomer in particular being effected only when the first comonomer has already undergone at least partial polymerization. This makes it possible to obtain not only diblock and triblock copolymers but also higher block copolymers which, depending on the sequence of monomer addition, have a block of one comonomer or another as the terminal block. However, in some cases block copolymers also form when all comonomers are supplied to the polymerization reaction simultaneously but one of them polymerizes significantly more quickly than the other(s). This is the case especially when isobutene and a vinylaromatic compound, in particular styrene, are copolymerized in the process according to the invention. This preferably affords block copolymers having a terminal polystyrene block. This is attributable to the fact that the vinylaromatic compound, especially styrene, polymerizes significantly more slowly than isobutene.

The polymerization may be carried out on a continuous or batchwise basis. Continuous processes may be carried out in the liquid phase analogously to known prior art processes for continuous polymerization of isobutene in the presence of Lewis acids, preferably boron trifluoride-or aluminum trichloride- or alkylaluminum chloride-based catalysts.

In the context of the present invention "reactive double bonds" or "vinylidene bonds" are to be understood as meaning (the sum total of) terminal, so-called α- and β-double bonds. These feature the following structural elements (represented here using the example of the isobutene homopolymer):

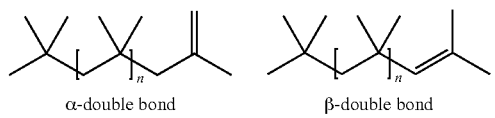

α-double bond        β-double bond

The proportion of reactive double bonds in the isobutene homo- or copolymers employable according to the invention based on the sum total of α- and β-double bonds may be from 30 to 100 mol %, preferably 40 to 97, particularly preferably 50 to 95, very particularly preferably 55 to 93 and in particular 60 to 90 mol %.

The distribution of α-:β-double bonds in the polyisobutene (B1) is generally from 90:10 to 10:90, preferably from 20:80 to 80:20, particularly preferably from 30:70 to 70:30, very particularly preferably from 65:35 to 35:65 and in particular from 60:40 to 40:60.

The proportion of α- and β-double bonds and also the distribution of α-:β-double bonds depends on the production of the polyisobutenes (B1).

The content of double bonds is determined and assigned to the respective structures according to the $^1$H-NMR method as described in An-Ru Guo, Xiao-Jian Yang, Peng-Fei Yan, Yi-Xian Wu, Journal of Polymer Science, Part A: Polymer Chemistry 2013, 51, 4200-4212; especially page 4205 and FIG. 5 on page 4206.

The vinylidene groups show the highest reactivity, for example in the thermal addition onto sterically demanding reaction partners such as maleic anhydride, while a double bond situated further inward in the macromolecules in most cases shows lower reactivity, if any, in functionalization reactions.

It is often the case among the vinylidene groups that the α-double bonds react more rapidly and readily than the β-double bonds, so that in the reaction mixture over the course of the reaction the reaction products of the reaction of the α-double bonds are initially formed to a greater extent than those of the β-double bonds. This can have the result that more severe reaction conditions are required to convert the β-double bonds than to convert the α-double bonds.

The number-average molecular weight $M_n$ of the polyisobutenes employable in the process according to the invention is from 10 000 to 50 000.

Advantageously employable are polyisobutenes having a molecular weight $M_n$ of at least 12 000, particularly preferably of at least 15 000, very particularly preferably of at least 17 000 and in particular of at least 20 000 g/mol.

The molecular weight $M_n$ of the polyisobutenes may preferably be up to 48 000, particularly preferably up to 45 000, very particularly preferably up to 40 000 and in particular up to 35 000 g/mol.

The polydispersity $M_w/M_n$ may be from 1.05 to 10, preferably from 1.1 to 8, particularly preferably from 1.2 to 7, very particularly preferably from 1.3 to 6 and especially preferably from 1.4 to 5.

The weight-average molecular weight $M_w$ may be calculated from these data for $M_n$ and polydispersity.

According to the present invention the reaction partners for the polyisobutene (B1) are maleic acid and derivatives thereof (B2).

Derivatives are understood to mean
the corresponding anhydrides in monomeric or else polymeric form,
mono- or dialkyl esters, preferably mono- or di-$C_1$-$C_4$-alkyl esters, particularly preferably mono- or dimethyl esters or the corresponding mono- or diethyl esters, and
mixed esters, preferably mixed esters having different $C_1$-$C_4$ alkyl components, particularly preferably mixed methyl ethyl esters.

It is preferable when the derivatives are anhydrides in monomeric form or di-$C_1$-$C_4$-alkyl esters, particularly preferably anhydrides in monomeric form.

In the context of this document, $C_1$-$C_4$-alkyl is to be understood as meaning methyl, ethyl, isopropyl, n-propyl, n-butyl, iso-butyl, sec-butyl and tert-butyl, preferably methyl and ethyl, particularly preferably methyl.

Examples of dicarboxylic acids (B2) include maleic acid and derivatives thereof.

It is particularly preferable when the reaction partner (B2) is maleic anhydride.

The molar ratio of component (B2) to a reactive double bond in the polyisobutene (B1) is according to the invention at least 2:1, particularly preferably at least 2.5:1, very particularly preferably at least 3:1, in particular at least 3.5:1 and especially at least 4:1.

A molar ratio of component (B2) to a reactive double bond in the polyisobutene (B1) of more than 30:1 generally provides no advantage; said ratio is preferably up to 25:1, particularly preferably up to 20:1 and very particularly preferably up to 18:1.

An excess of component (B2) may generally be easily removed by distillation or by sublimation. The thus recovered excess component (B2) may then be reused in a further reaction.

The reaction according to the invention is generally carried out at a temperature of 180° C. to 250° C., preferably 190° C. to 240° C. and particularly preferably of 200° C. to 230° C.

Since maleic anhydride as component (B2) boils at about 202° C. the reaction is carried out at temperatures above 200° C., preferably above 190° C. and particularly preferably even at temperatures above 180° C. at least under autogenous pressure, preferably under slight positive pressure.

This pressure should be at least 100 mbar, preferably at least 200 mbar, particularly preferably at least 500 mbar and in particular at least 1 bar.

Generally up to 10 bar of positive pressure, preferably up to 8 bar, particularly preferably up to 7 bar and very particularly preferably up to 5 bar, is sufficient.

The reaction is preferably carried out under an inert atmosphere; particularly preferably a nitrogen or carbon dioxide atmosphere is used.

Depending on the temperature the duration of the reaction according to the invention should be at least 15 minutes, preferably at least 30, particularly preferably at least 45 and very particularly preferably at least 60 minutes. In particular, the reaction time should be at least 2 hours.

Generally and depending on the temperature the reaction should be complete within 10 hours, preferably within 8 and particularly preferably within 7 hours.

In one possible embodiment of the present invention the reaction is carried out without further solvent. This is preferable when a large excess of component (B2) is employed and the reaction may be carried out in the melt of the liquid or molten component (B2).

However, in a preferred embodiment the reaction is carried out in a solvent which, as will be appreciated, should preferably show no substantial reaction with the polyisobutene and/or the component (B2) under the reaction conditions. The solvent is preferably selected from hydrocarbons or hydrocarbon mixtures, carboxylic esters, ethers or ketones, particularly preferably hydrocarbons or hydrocarbon mixtures.

Preferred aromatic hydrocarbon mixtures are those that comprise predominantly aromatic $C_7$ to $C_{14}$ hydrocarbons and may encompass a boiling range from 110° C. to 300° C., particular preference being given to toluene, o-, m- or p-xylene, trimethylbenzene isomers, tetramethylbenzene isomers, ethylbenzene, cumene, tetrahydronaphthalene and mixtures comprising these compounds.

Examples include the Solvesso® range from ExxonMobil Chemical, particularly Solvesso® 100 (CAS-No. 64742-95-6, predominantly $C_9$ and $C_{10}$-aromatics, boiling range about 154° C.-178° C.), 150 (boiling range about 182° C.-207° C.) and 200 (CAS-No. 64742-94-5), and also the Shellsol® range from Shell, Caromax® (e.g. Caromax® 18) from Petrochem Carless and Hydrosol from DHC (e.g. Hydrosol® A 170). Hydrocarbon mixtures of paraffins, cycloparaffins and aromatics are also commercially available under the designations Kristallol (for example Kristallol 30, boiling range about 158° C.-198° C. or Kristallol 60: CAS-No. 64742-82-1), white spirit (for example likewise CAS-No. 64742-82-1) or solvent naphtha (light: boiling range about 155° C.-180° C., heavy: boiling range about 225° C.-300° C.). The aromatics content of such hydrocarbon mixtures is generally more than 90 wt %, preferably more than 95 wt %, particularly preferably more than 98 wt % and very particularly preferably more than 99 wt %. It may be advantageous to use hydrocarbon mixtures having a particularly reduced content of naphthalene.

(Cyclo)aliphatic hydrocarbons include for example decalin, alkylated decalin and isomer mixtures of linear or branched alkanes and/or cycloalkanes.

In a preferred embodiment the employed solvent has a boiling point at standard pressure of at least 140° C.

In a preferred embodiment of the present invention the reaction is carried out in a reactor whose reaction volume is occupied to an extent of at least 50% by the liquid reaction mixture, preferably to an extent of at least 60%, particularly preferably to an extent of at least 66%, very particularly preferably to an extent of at least 75%, in particular to an extent of at least 90% and especially completely.

This has the advantage that at the reaction temperature the reaction partner maleic anhydride remains in the liquid reaction mixture and only a small proportion thereof can escape into the gas phase, thus increasing the availability of component (B2) in the reaction mixture.

In a further preferred embodiment said reactor exhibits a low level of backmixing or freedom from backmixing. These conveying characteristics are characterized by a Bodenstein number of at least 3, preferably at least 5, particularly preferably at least 7.

Preferred embodiments of such apparatuses are paddle dryers with or preferably without a cooling zone, optionally with forced discharge means.

Such paddle dryers employed according to the invention are preferably not separated into heating and cooling zones in order not to bring about a sudden reduction in temperature. By contrast the temperature of the residue increases over the course of the passage of the residue through the apparatus, preferably according to a temperature gradient which over the course of the passage of the residue through the apparatus changes by not more than 50° C. and particularly preferably no substantial temperature change in the course of the passage of the residue through the apparatus, i.e. less than 20° C. and in particular less than 10° C.

Such paddle dryers are constructed substantially horizontally and the conveying of the residue is generally effected via single or twin mixing and kneading shafts in the interior of the apparatus. In the technical literature these apparatuses are also referred to as particle bed reactors, kneader-dryers or kneader-reactors.

It is preferable when the paddle dryer has a forced conveying means in the axial direction. The forced conveying is achieved for example by tilting the surfaces of the conveying elements.

Axial transport through the apparatus may preferably be effected via an arrangement of conveying, kneading and/or mixing elements, for example disk elements, shafts, screws, blades, wipers or rotors.

It is particularly preferable when to narrow the residence time distribution in the paddle dryer the product-conducting interior is separated into various segments with baffle-like plates. It is particularly preferable when at least two plates are employed.

The heating is effected via the wall and may be effected in any desired manner. It is preferable when the heating is effected not only via the outer wall of the apparatus but also via the internals such as cleaning hooks, segmenting plates and kneading shafts.

The thermal energy input into the reactor contents via the walls is typically more than 120 kJ/kg of reactor contents and less than 2400 kJ/kg of reactor contents, preferably more than 220 kJ/kg of reactor contents and less than 1800 kJ/kg of reactor contents, particularly preferably more than 300 kJ/kg of reactor contents and less than 1400 kJ/kg of reactor contents and very particularly preferably more than 360 kJ/kg of reactor contents and less than 900 kJ/kg of reactor contents.

The heating distance of the reaction mixture applied onto the paddle dryer is preferably more than 10% and less than 70% of the total length of the paddle dryer, preferably more than 20% and less than 60%, particularly preferably more than 30% and less than 50% of the total length of the paddle dryer.

Generally sufficient in the apparatus is a mechanical energy input of 5 W/kg or more, preferably 10 or more W/kg, particularly preferably 20 or more, very particularly preferably 40 or more, in particular 80 or more and especially 100 W/kg or more. An energy input of more than 200 W/kg generally brings no advantages. The reported specific power input is the power input per amount of reaction mixture in the apparatus.

It is further advantageous when the paddle dryer has a forced cleaning of the inner, product-contacting surfaces of at least 50%, preferably at least 60%, very particularly preferably of at least 70% and especially at least 80% of these inner, product-contacting surfaces. The forced cleaning is accomplished by the closeness of the conveying elements to the outer wall/by the closeness of cleaning hooks to the conveying elements.

Such apparatuses are available for example from List AG, Arisdorf, Switzerland, under the trade name Discotherm® B or List-CRP or AP, and also from Buss-SMS-Canzler GmbH, Butzbach, Germany under the trade name Reasol® or Reactotherm®.

Discharge means for the forced discharge of the reaction output may optionally be present, for example screws, preferably twin-screws.

However, the mechanical conveying means of the apparatus are usually sufficient to discharge the reaction mixture from the apparatus.

Stabilizers to inhibit side reactions, preferably as described in EP 156310 A2, may optionally be added to the reaction mixture.

These additives are alkoxides, preferably the $C_2$- to $C_4$-alkoxides, of titanium, zirconium, vanadium or aluminum. Such compounds are known per se and available. Especially suitable alkoxides include the compounds: titanium(IV) butoxide=$Ti(C_4H_9O)_4$, titanium(IV) i-butoxide=$Ti[(CH_3)_2CHCH_2O]_4$, titanium(IV) ethoxide=$Ti(C_2H_5O)_4$, titanium(IV) i-propoxide=$Ti(OC_3H_7)_4$, titanium (IV) n-propoxide=$Ti(C_3H_7O)_4$, zirconium n-butoxide-butanol complex=$(C_4H_9O)_4Zr.C_4H_9OH$, zirconium i-propoxide=$Zr(OC_3H_7)=C_3H_7OH$, zirconium n-propoxide=$Zr(OC_3H_7)_4$, vanadium(V) tri-n-butoxide oxide=$VO(OC_4H_9)_3$, vanadium(V) triethoxide oxide=$VO(OC_2H_5)_3$, vanadium(V) tri-i-propoxide oxide=$VO(OC_3H_7)_3$, vanadium(V) tris-n-propoxide oxide=$VO(OC_3H_7)_3$, aluminum i-butoxide=$Al(OC_4H_9)_3$, aluminum n-butoxide=$Al(OC_4H_9)_3$, aluminum s-butoxide=$Al(OC_4H_9)_3$, aluminum t-butoxide=$Al(OC_4H_9)_3$ or aluminum i-propoxide=$Al(OC_3R_7)_3$.

The recited alkoxides are in the liquid state, possibly in the form of a complex with the corresponding alcohol, and are used in the reaction according to the invention in this form. They are employed in a purity of 95 to 99 wt % and in the case of the alkoxides of aluminum of 90 to 99 wt %. The alkoxides to be used are soluble in the reaction mixture.

The stabilizers are used in amounts of 1 to 5000, preferably 5 to 1000, ppmw, particularly preferably 10 to 500 ppmw, very particularly preferably 25 to 300 ppmw, based on the employed olefin.

In a preferred embodiment the process according to the invention employs no further stabilizers.

In the reaction of polyisobutene homopolymer with maleic anhydride shown here by way of example compounds bearing more than one succinic anhydride group per polymer may form as descendent products, especially at relatively high molar ratios of maleic anhydride to polyisobutene. These products have different structures proceeding from α- or β-double bonds:

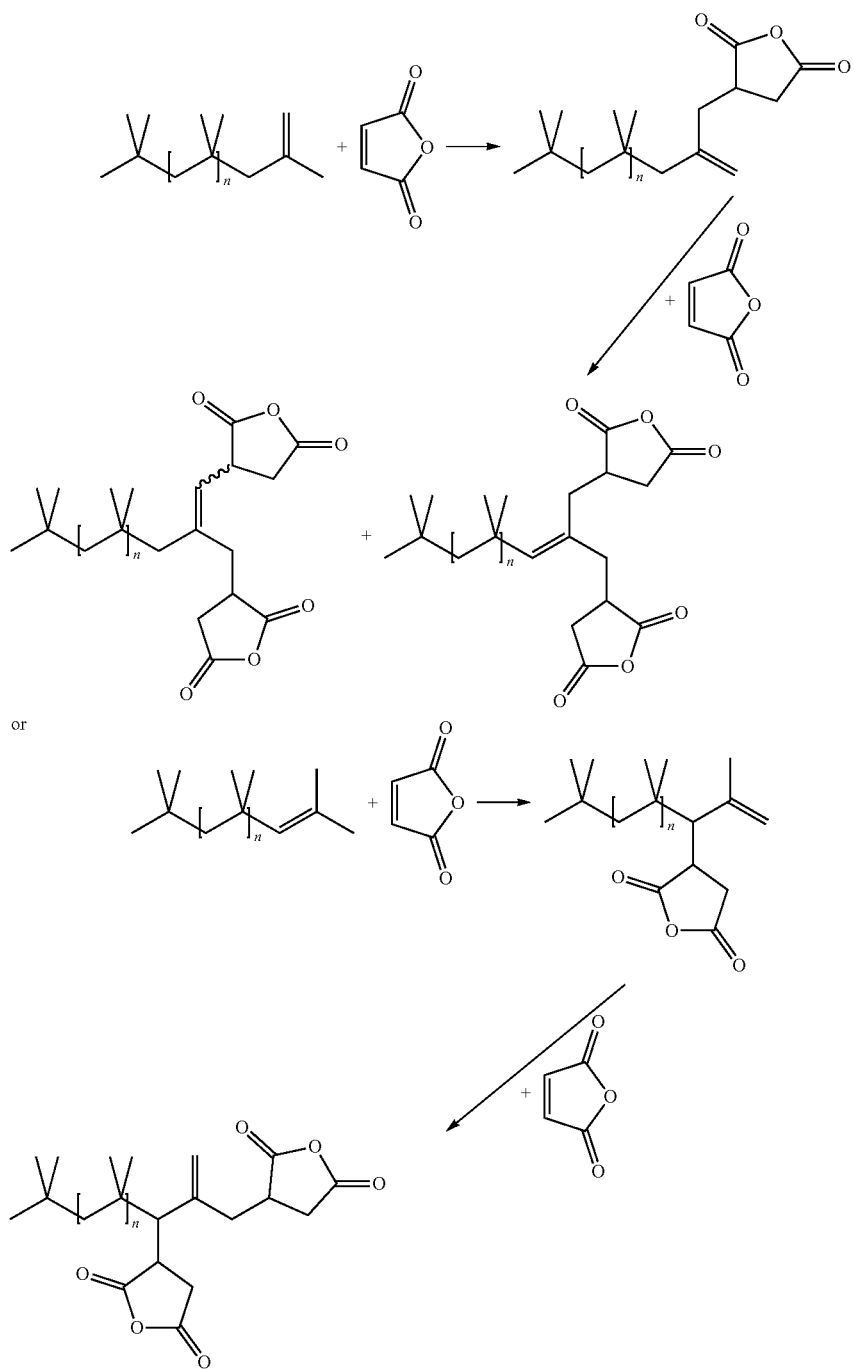

In these reaction schemes, n is a natural number from 176 to 890, preferably from 214 to 855, particularly preferably from 265 to 801, even more preferably from 301 to 712 and in particular from 355 to 623.

The present invention accordingly also provides reaction mixtures, obtainable by reaction of polyisobutene homopolymer or isobutene-comprising copolymers with maleic anhydride, which comprise at least one of the products bearing at least one succinic anhydride group as shown in the two reaction schemes above.

The ratio of more highly maleated to monomaleated components may be reported by the "bismaleation level" (BML). The BML is known per se (see also U.S. Pat. No. 5,883,196) and can be determined by the following formula:

BML=100%×[(wt % (BM PIBSA)/(wt % (BM PIBSA)+wt % (PIBSA))]

where wt % (X) represents the respective proportion by weight of component X (X=PIBSA (monomaleated polyisobutene) or BM PIBSA (more than monomaleated polyisobutene)) in the reaction product of polyisobutene with maleic anhydride.

The bismaleation level is preferably calculated from the saponification number according to DIN 53401: 1988-06 of the sample. It may be necessary here to solubilize the sample with a suitable solvent, preferably in a 2:1 mixture of toluene and ethanol.

It should be noted here that only the ratio of the more highly maleated components to the monomaleated components is taken into account, whereas unconverted polyisobutene present in the reaction mixture, for example that which does not comprise any reactive double bonds, is not included in the determination of the bismaleation level. Therefore, the reaction mixture may also comprise unconverted polyisobutene, which usually corresponds to the proportion in the employed polyisobutene that does not comprise any reactive double bonds, whereas the proportion in the polyisobutene that comprises reactive double bonds preferably reacts completely or virtually completely.

The proportion of unconverted polyisobutene present in the reaction mixture therefore generally corresponds to 100 minus the above-specified proportion of reactive double bonds in the isobutene homo- or copolymers employable according to the invention.

To determine the proportion of maleated components in relation to unconverted polyisobutene, the reaction mixture is dissolved in n-heptane and applied to a column comprising silica gel 60 and eluted with n-heptane until there is no longer any product present in the eluate. Using column chromatography, the unconverted polyisobutene is separated from the maleated components since the maleated components are not eluted. Once the solvent has been removed by distillation, the weight fraction of maleated components in the reaction mixture is determined by weighing.

The above formula can also be applied analogously to components (B2) other than maleic anhydride and for the sake of simplicity is here likewise referred to as the bismaleation level even for components (B2) other than maleic anhydride.

The reaction conditions of the process according to the invention result in bismaleation levels of up to 20%, preferably up to 15% or less, for example 14%, 13%, 12% or 10%; or 10% or less, for example 2% to 9%, 3% to 8%, 4% to 7%, 5% or 6%.

However, the bismaleation level is generally at least 1%, preferably 2% to 9%, in particular 3% to 8% or 4% to 7%.

As component C) the molding compositions according to the invention may comprise up to 60, preferably up to 50, wt % of further added substances.

Fibrous or particulate fillers C) include carbon fibers, glass fibers, glass beads, amorphous silica, calcium silicate, calcium metasilicate, magnesium carbonate, kaolin, chalk, pulverulent quartz, mica, barium sulfate and feldspar which are employed in amounts of 1 to 50 wt %, in particular 5 to 40, preferably 10 to 40, wt %. Preferred fibrous fillers include carbon fibers, aramid fibers, and potassium titanate fibers, wherein glass fibers in the form of E-glass are particularly preferred. These may be used in the form of rovings or chopped glass in the forms commercially available.

The fibrous fillers may have been surface-pretreated with a silane compound in order to improve compatibility with the thermoplastics.

Suitable silane compounds are those of general formula

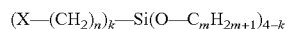

in which the substituents are defined as follows:

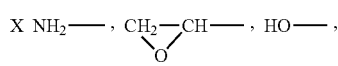

n an integer from 2 to 10, preferably from 3 to 4
m an integer from 1 to 5, preferably from 1 to 2
k an integer from 1 to 3, preferably 1.

Preferred silane compounds are am inopropyltrimethoxysilane, am inobutyltrimethoxysilane, aminopropyltriethoxysilane, aminobutyltriethoxysilane and also the corresponding silanes which comprise a glycidyl group as substituent X.

The silane compounds are generally used for surface coating in amounts of 0.01 to 2, preferably 0.025 to 1.0 and in particular 0.05 to 0.5 wt % (based on C)).

Acicular mineral fillers are also suitable.

In the context of the invention acicular mineral fillers are to be understood as meaning a mineral filler having distinctly acicular character. These include for example acicular wollastonite. The L/D (length to diameter) ratio of the mineral is preferably from 8:1 to 35:1, preferably from 8:1 to 11:1. The mineral filler may optionally have been pretreated with the above-mentioned silane compounds; however, pretreatment is not an essential requirement.

Further fillers include kaolin, calcined kaolin, wollastonite, talc and chalk and also lamellar or acicular nanofillers preferably in amounts between 0.1 and 10%. Preferably employed for this purpose are bohmite, bentonite, montmorillonite, vermiculite and hectorite. In order to obtain good compatibility between the lamellar nanofillers and the organic binder the lamellar nanofillers are subjected to organic modification according to the prior art. Addition of the lamellar or acicular nanofillers to the nanocomposites of the invention leads to a further increase in mechanical strength.

As component C) the molding compositions according to the invention may comprise 0.05 to 3, preferably 0.1 to 1.5 and in particular 0.1 to 1 wt % of a lubricant.

Preference is given to Al salts, alkali metal salts, alkaline earth metal salts or esters or amides of fatty acids having from 10 to 44 carbon atoms, preferably having from 12 to 44 carbon atoms.

The metal ions are preferably alkaline earth metal and Al, wherein Ca or Mg are particularly preferred.

Preferred metal salts are Ca stearate and Ca montanate and also Al stearate.

It is also possible to use mixtures of various salts in any desired mixing ratio.

The carboxylic acids may be mono- or dibasic. Examples include pelargonic acid, palmitic acid, lauric acid, margaric acid, dodecanedioic acid, behenic acid, and particularly preferably stearic acid, capric acid and montanic acid (mixture of fatty acids having 30 to 40 carbon atoms).

The aliphatic alcohols may be mono- to tetrahydric. Examples of alcohols include n-butanol, n-octanol, stearyl alcohol, ethylene glycol, propylene glycol, neopentyl glycol, and pentaerythritol, wherein glycerol and pentaerythritol are preferred.

The aliphatic amines may be mono- to trifunctional. Examples include stearylamine, ethylenediamine, propylenediamine, hexamethylenediamine, and di(6-aminohexyl)amine, wherein ethylenediamine and hexamethylenediamine are particularly preferred. Preferred esters or amides are accordingly glyceryl distearate, glyceryl tristearate, ethylenediamine distearate, glyceryl monopalmitate, glyceryl trilaurate, glyceryl monobehenate and pentaerythrityl tetrastearate.

It is also possible to use mixtures of different esters or amides or esters combined with amides in any desired mixing ratio.

Suitable sterically hindered phenols C) include in principle all compounds having a phenolic structure and having at least one sterically demanding group on the phenolic ring.

Preferably contemplated are for example compounds of formula

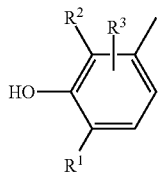

in which:

$R^1$ and $R^2$ are an alkyl group, a substituted alkyl group or a substituted triazole group, wherein the moieties $R^1$ and $R^2$ may be identical or different and $R^3$ is an alkyl group, a substituted alkyl group, an alkoxy group or a substituted amino group.

Antioxidants of the recited type are described for example in DE-A 27 02 661 (U.S. Pat. No. 4,360,617).

Another group of preferred sterically hindered phenols derive from substituted benzenecarboxylic acids, in particular from substituted benzenepropionic acids.

Particularly preferred compounds from this class are compounds of the formula

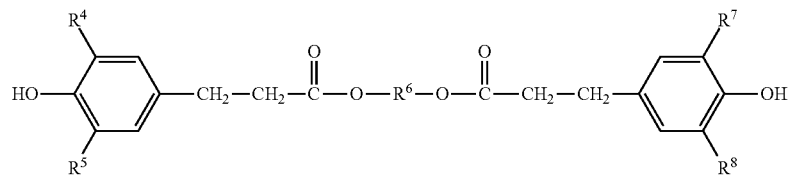

where $R^4$, $R^5$, $R^7$ and $R^8$ are independently of one another $C_1$-$C_8$ alkyl groups which may themselves be substituted (at least one thereof being a sterically demanding group), and $R^6$ is a divalent aliphatic moiety having from 1 to 10 carbon atoms which may also have C—O bonds in the main chain.

Preferred compounds of this formula are

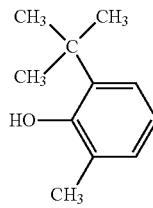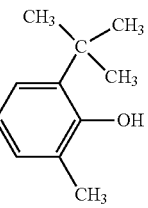

(Irganox® 245 from BASF SE)

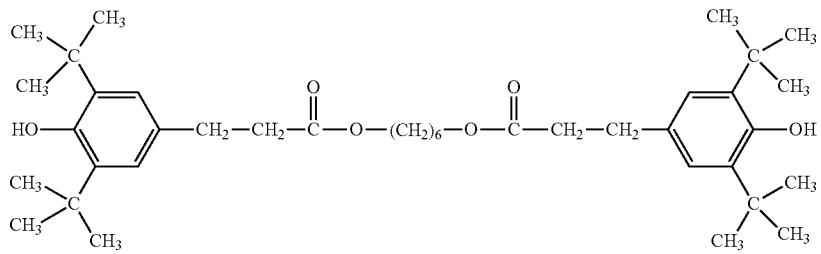

(Irganox® 259 from BASF SE)

Sterically hindered phenols altogether include for example:

2,2'-methylenebis(4-methyl-6-tert-butylphenol), 1,6-hexanediol bis[3-(3,5-di-tert-butyl-4-hydroxyphenyl) propionate], pentaerythrityl tetrakis[3-(3,5-di-tert-butyl-4-hydroxyphenyl)propionate], distearyl 3,5-di-tert-butyl-4-hydroxybenzylphosphonate, 2,6,7- trioxa-1-phosphabicyclo[2.2.2]oct-4-ylmethyl 3,5-di-tert-butyl-4-hydroxyhydrocinnamate, 3,5-di-tert-butyl-4- hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3,5-di-tert-butyl-4-hydroxybenzyl)benzene, 4,4'-methylenebis(2,6-di-tert-butylphenol), 3,5-di-tert-butyl-4-hydroxybenzyldimethylamine.

Compounds that have proven particularly effective and are therefore preferably employed are 2,2'-methylenebis(4-methyl-6-tert-butylphenol), 1,6-hexanediol bis(3,5-di-tert-butyl-4-hydroxyphenyl)propionate (Irganox® 259), pentaerythrityl tetrakis[3-(3,5-di-tert-butyl-4-hydroxyphenyl) propionate] and N,N'-hexamethylenebis-3,5-di-tert-butyl-4-hydroxyhydrocinnamide (Irganox® 1098) and the above described Irganox® 245 from BASF SE which is particularly suitable.

The antioxidants C) which may be employed individually or as mixtures are present in an amount of 0.05 up to 3 wt %, preferably of 0.1 to 1.5 wt % and in particular 0.1 to 1 wt % based on the total weight of the molding compositions A) to C).

In some cases, sterically hindered phenols having not more than one sterically hindered group in the ortho-position to the phenolic hydroxy group have proven particularly advantageous, in particular when colorfastness is assessed during storage in diffuse light for prolonged periods.

As component C) the molding compositions according to the invention may comprise 0.05 to 5, preferably 0.1 to 2 and in particular 0.25 to 1.5 wt % of a nigrosin.

Nigrosins are generally understood to refer to a group of black or gray phenazine dyes (azine dyes) in various embodiments (water-soluble, liposoluble, gasoline-soluble), and are related to the indulines, and are used in wool dyeing and printing, for providing black color to silks, and for dyeing leather and for shoe polishes, varnishes, plastics, heat-cured coatings, inks and the like, and also as microscopy dyes.

Nigrosins are obtained industrially by heating nitrobenzene, aniline and aniline hydrochloride with metallic iron and $FeCl_3$ (name derives from the Latin niger=black).

The component C) may be used as a free base or else as a salt (for example hydrochloride).

Further details relating to nigrosins can be found by way of example in the electronic encyclopedis Rompp Online, Version 2.8, Thieme-Verlag Stuttgart, 2006, keyword "Nigrosin".

As component C) the molding compositions according to the invention may comprise 0 to 20, preferably 1 to 15 and in particular 5 to 15 wt % of red phosphorus or/and a nitrogen-containing flame retardant, preferably a melamine compound.

Suitable compounds (often also described as salts or adducts) are melamine sulfate, melamine, melamine borate, oxalate, phosphate prim., phosphate sec. and pyrophosphate sec., melamine neopentyl glycol borate, and polymeric melamine phosphate (CAS No. 56386-64-2 and 218768-84-4).

As component C) the thermoplastic molding compositions according to the invention may comprise customary processing aids such as stabilizers, oxidation retarders, agents to counteract thermal degradation and ultraviolet light degradation, lubricants and release agents, colorants such as dyes and pigments, nucleating agents, plasticizers, etc.

Examples of oxidation retarders and heat stabilizers are sterically hindered phenols and/or phosphites and amines (e.g. TAD), hydroquinones, aromatic secondary amines such as diphenylamines, various substituted members of these groups and mixtures of these in concentrations of up to 1% by weight, based on the weight of the thermoplastic molding compositions.

Examples of UV stabilizers, which are generally employed in amounts of up to 2 wt % based on the molding composition, include various substituted resorcinols, salicylates, benzotriazoles and benzophenones.

Colorants that may be added include inorganic pigments, such as titanium dioxide, ultramarine blue, iron oxide and carbon black, and organic pigments, for example phthalocyanines, quinacridones, perylenes, and also dyes, for example anthraquinones.

Employable nucleating agents include sodium phenylphosphinate, aluminum oxide, silicon dioxide and preferably talc.

The thermoplastic molding compositions according to the invention may be produced by processes known per se by mixing the starting components in customary mixing apparatuses such as screw extruders, Brabender mills or Banbury mills and then extruding the resulting mixture. After extrusion the extrudate may be cooled and comminuted. It is also possible to premix individual components and then add the remaining starting materials individually and/or likewise in the form of a mixture. Mixing temperatures are generally in the range from 230° C. to 320° C.

In a further preferred procedure, components B) and optionally C) may be mixed with a prepolymer, formulated and pelletized. The pelletized material obtained is then condensed to the desired viscosity continuously or batchwise under inert gas in the solid phase at a temperature below the melting point of component A).

The molding compositions employable according to the invention are suitable for producing molded articles of any type which exhibit improved transparency and/or improved clarity.

Flowability, mechanical properties, WAB and hygroscopic properties are markedly improved. They are therefore particularly suitable for materials for covers, housings, accessory parts and sensors for applications in, for example, the automotive, electronics, telecommunications, information technology, computer, household, sports, medical, or entertainment sectors.

EXAMPLES

The following components were used:
Component A1:
Polyamide 6 having an intrinsic viscosity IV of 150 ml/g, measured as a 0.5 wt % solution in 96 wt % sulfuric acid at 25° C. according to ISO 307 (Ultramid® B27 from BASF SE was employed.)
Component A2:
Polyamide 66 having an intrinsic viscosity IV of 125 ml/g, measured as a 0.5 wt % solution in 96 wt % sulfuric acid at 25° C. according to ISO 307 (Ultramid® A24 from BASF SE was employed.)
Component B1V:
High molecular weight polyisobutene Oppanol® B10 from BASF SE, Ludwigshafen having a molar weight Mn of about 17 000 and a double bond content of 40% α- and 47% β-double bonds.
Production of Component B2
High molecular weight polyisobutene Oppanol® B10 from BASF SE, Ludwigshafen having a molar weight Mn of about 17 000 and a double bond content of 40% α- and 47% β-double bonds and maleic anhydride (molar ratio maleic anhydride:polyisobutene=5:1 (based on the sum of α- and β-double bonds)) were initially charged in a pressure vessel. The reaction mixture was stirred under nitrogen for 7 hours at 240° C. The vessel was then cooled to 200° C. and xylene was added slowly. The solution having a solids content of about 70% was discharged from the vessel at 120° C., diluted to 50% strength with heptane, filtered off and distilled off under vacuum at 205° C.

| Maleic anhydride:polyisobutene | Yield (%) | Saponification number (mg KOH/g) | Proportion of maleated components |
|---|---|---|---|
| 5:1 | 47 | 6 | 47% |

Production of Component B3

The abovementioned procedure was also used for the polyisobutene Oppanol® B12 from BASF SE, Ludwigshafen having a molar weight Mn of about 22 000 and a double bond content of 40% α- and 40% β-double bonds. The maleic anhydride: polyisobutene ratio was 5:1. The solids content in the xylene solution was 60%, the yield was 40%. The proportion of maleated components was 40%.

Production of Component B4

The polyisobutene Oppanol® B15 from BASF SE, Ludwigshafen having a molar weight Mn of about 37 000 and a content of α- and β-double bonds (in total) of 75% was filled into a kneader and blanketed with nitrogen. Maleic anhydride was added (maleic anhydride: polyisobutene ratio=15:1) and the mixture was initially kneaded at room temperature for 5 min. The kneader was heated to 240° C. and the mixture was kneaded at 240° C. for 60 min. A vacuum was then slowly applied under a slight nitrogen stream and increased in stepwise fashion; the mixture was held under vacuum for 15 min. The kneader was then cooled to 190° C. and the product discharged. The yield was 35%.

Under these conditions the residual content of maleic anhydride was able to be reduced to less than 0.005 g/100 g of product.

| Temperature (° C.) | Residence time (min) | Maleic anhydride:polyisobutene | Conversion [%] |
|---|---|---|---|
| 240 | 60 | 15:1 | 32 |

The proportion of maleated components was determined as 25% to 30%.

Component B5V: 50:50 mixture of Oppanol® B10 and Glissopal®—SAF from BASF SE (a low molecular weight polyisobutene having a molecular weight (Mn) of 1000 g/mol which was modified with maleic anhydride.

Distribution number: 85-95 mg KOH/g

MA content: no more than 0.17 wt %

Component B6V:

Fusabond® MN 493 D from DuPont

Ethylene-1-Octene-MA copolymer (60:39.5:0.5).

Component C1:

Ca stearate

Component C2:

Irganox® 1098 from BASF SE CAS 23128-74-7

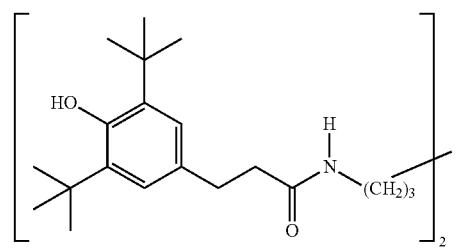

Component C3:

Irgafos® 168 from BASF SE CAS 31570-04-4

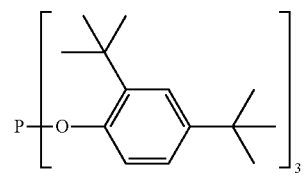

Component C4:

2090 batch of KI/CuI (4:1) in component A1

Component C5:

Glass fibers (chopped glass)

Production of Molding Compositions

Compounding performed in a ZSK 18 apparatus, throughput 6 kg/h

Melt temperature: 280-300° C.

Injection Molding Conditions

Melt temperature: 260-290° C.

Mold temperature: 60-80° C.

Measurements:

Charpy notched impact strength: ISO179-2/1eA(F)

Charpy unnotched impact strength: ISO179-1/1eU

Tensile test: ISO 527-2

MVR: ISO 1133-1 PA6/PA66 at 275° C./5 kg

Heat Ageing Resistance:

Charpy rods were stored in a circulating air oven at 150° C. for various durations: 96 h; 240 h; 504 h; 984 h. The mechanics were then determined according to the standard: ISO179-2/1eA(F).

Molecular Weight Determination of Component B:

Gel permeation chromatograpy using THF as the solvent and polystyrene as the standard. The columns employed were two 30 cm PLgel Mixed-B columns manufactured with a pore size of 10 μm and an internal diameter of 7.5 mm. The separating range of the columns is 500-10 000 000 g/mol.

% of Functionalized Chains:

To determine the percentage of functionalized chains the polymer was dissolved in n-heptane and applied to a column comprising silica gel 60. The non-functionalized chains were separated from the functionalized chains by column chromatography since the functionalized chains were not eluted. The proportion of non-functionalized chains was weighed to determine the percentage of functionalized chains. This method was assisted by 1H-NMR measurements based on the signals for the different double bonds (product vs. starting material).

Clarity+Haze:

Determination of total transmission, haze according to ASTM D 1003 and clarity. The instrument used was a BYK Gardner haze gard plus.

Contact Angle:

The polyamide samples were dried at 80° C. and welded into aluminum sacks. Measurement of the contact angle was carried out directly after opening of the sacks to prevent effects caused by absorbed moisture. A drop of deionized water (milli-Q) is applied to the surface and the static contact angle is determined at 23° C. using a DSA100 instrument from Krüss GmbH.

| Instrument | DSA100, Krüss |
|---|---|
| Conditions of measurement | 23° C., static contact angle |
| Measurement liquids | Deionized water (Milli-Q) |
| Sample preparation | The PA samples were measured immediately after opening from the welded packaging. |

TABLE 1

PA6 compounds and mechanics measurements

| Exp No. | A1 (%) | A2 (%) | B1V (%) | B2 (%) | B3 (%) | B4 (%) | B5V (%) | B6V (%) | C1 (%) | C2 (%) | C3 (%) |
|---|---|---|---|---|---|---|---|---|---|---|---|
| 1V | 100 | | | | | | | | | | |
| 2V | 99 | | | | | | | | | 0.5 | 0.5 |
| 3V | 90 | | 10 | | | | | | | | |
| 4 | 10 | | | 5 | | | | | | | |
| 5 | 90 | | | 10 | | | | | | | |
| 6 | 89.1 | | | 9.9 | | | | | | 0.5 | 0.5 |
| 7 | 80 | | | 20 | | | | | | | |
| 8 | 89 | | | | | 9.9 | | | | 0.5 | 0.5 |
| 9 | 89 | | | | | | 9.9 | | | 0.5 | 0.5 |
| 10V | 90 | | | | | | | 10 | | | |
| 11V | 69 | | | | | | | | | 0.5 | 0.5 |
| 12 | 59.1 | | | 9.9 | | | | | | 0.5 | 0.5 |
| 13 | 59.1 | | | | 9.9 | | | | | 0.5 | 0.5 |
| 14 | 59 | | | | | 10 | | | | 0.5 | 0.5 |

| Exp No. | C4 (%) | C5 (%) | Notched Charpy, notch A, 23° C./50% rel. hum. | Notched Charpy, notch A −30° C. | Unnotched Charpy −50° C. | MVR |
|---|---|---|---|---|---|---|
| 1V | | | 6.8 | 7.3 | | 151 |
| 2V | | | 6.5 | 8.6 | | 34 |
| 3V | | | 8.7 | 5.3 | All break 120 ± 60 | 234 |
| 4 | | | 13.0 | 10.1 | | 125 |
| 5 | | | 15.2 | 12.1 | Only 1 out of 5 breaks | 108 |
| 6 | | | 15.6 | 11.5 | | 41 |
| 7 | | | 17.0 | 13.3 | | 82 |
| 8 | | | 17.8 | 12.2 | | 40 |
| 9 | | | 18.8 | 11.9 | | 56 |
| 10V | | | 12.3 | 8.9 | | |
| 11V | | 30 | 11.6 | 8.4 | | 12 |
| 12 | | 30 | 17.1 | 9.3 | | 15 |
| 13 | | 30 | 17.9 | 10.6 | | 12 |
| 14 | | 30 | 17.8 | 10.0 | | 22 |

TABLE 2

PA66 compounds and mechanics values

| Exp No. | A1 (%) | A2 (%) | B1V (%) | B2 (%) | B3 (%) | B4 (%) | B5 (%) | B6V (%) | C1 (%) | C2 (%) | C3 (%) | C4 (%) | C5 (%) | Notched charpy, notch A, 23° C./50% rel. hum. | Notched Charpy, Notch A, −30° C. | MVR |
|---|---|---|---|---|---|---|---|---|---|---|---|---|---|---|---|---|
| 1V | | 99 | | | | | | | 0.3 | | | 0.7 | | 5.16 | 5.2 | 192 |
| 2 | | 91 | | 8 | | | | | 0.3 | | | 0.7 | | 11.1 | 8.22 | 147 |
| 3 | | | | | | | 8 | | 0.3 | | | 0.7 | | 12.5 | 8 | 182 |
| 4V | | | | | | | | 8 | 0.3 | | | 0.7 | | 7.7 | 6.23 | 124 |
| 5 | | 61 | | 8 | | | | | 0.3 | | | 0.7 | 30 | 13.7 | 8.14 | 38 |
| 6 | | 61 | | | | 8 | | | 0.3 | | | 0.7 | 30 | 12.2 | 7.7 | 45 |
| 7V | | 61 | | | | | | 8 | 0.3 | | | 0.7 | 30 | 14.7 | 9.32 | 31 |

TABLE 3

Heat ageing resistance at 150° C.

| Exp No. | Storage time at 150° C. [h] | Notched Charpy, notch A, 23° C./ 50% rel. hum. | Unnotched Charpy Notch A, −30° C. |
|---|---|---|---|
| 2 | 0 | 11.1 | 1 out of 5 breaks |
|  | 96 | 11.0 | 1 out of 5 breaks |
|  | 240 | 8.6 | 0 out of 5 break |
|  | 504 | 6.7 | 1 out of 5 breaks |
|  | 984 | 3.5 | All break |
| 4V | 0 | 7.7 | All break |
|  | 96 | 5.1 | All break |
|  | 240 | 4.1 | All break |
|  | 504 | 2.7 | All break |
|  | 984 | 1.2 | All break |

Optical Properties

The pelletized polyamide material was melted in a conical twin-screw extruder (DSM Xplore, 15 cc) under the following conditions:
  Residence time: 2 min
  Barrel temperature: 260° C.
  Speed of rotation: 80 rpm The injection molding of the molten polymers was performed in a 10 cc DSM micro-injection molding apparatus. To this end the molten compound was filled directly into the cylinder of the injection molding machine under nitrogen. The melt was subsequently injected into a polished rectangular mold of dimensions (30 mm×30 mm×1.27 mm). The following parameters were used:
  Mold: plaque, polished; 30 mm×30 mm×1.27 mm
  Mold temperature: 60° C.
  Cylinder temperature: 260° C.
  Injection pressure: 8-9 bar

TABLE 4

| Exp. No. | Description | Transmission % | Haze % | Clarity % |
|---|---|---|---|---|
| 1V | 100% A1 | 67 | 101 | 74 |
| 6 | A1/B2 | 51 | 101 | 62 |
| 8 | A1/B3 | 55 | 100 | 67 |
| 15V | A1/B6V (90:10) | 37 | 102 | 12 |

Contact Angle/Polarity

It is apparent that the PIBSAI increases the contact angle to water, thus demonstrating hydrophobization. This is not observed for Fusabond® MN-493 D.

TABLE 5

| Exp No. | KW H2O [°] |
|---|---|
| 1V | 75.3 ± 2.5 |
| 5 | 95.4 ± 2.6 |
| 15V | 73.6 ± 3.9 |

The invention claimed is:

1. A thermoplastic molding composition comprising
   A) 20 to 99.9 wt % of a thermoplastic polyamide,
   B) 0.1 to 40 wt % of an alkenylsuccinic acid derivative obtained by reaction of a polyisobutene (B1) having a number-average molecular weight Mn of 10,000 to 50,000 at a temperature of 180° C. to 250° C. with maleic acid or derivatives thereof (B2) in a stoichiometric ratio of at least 2 equivalents of the maleic acid or derivatives thereof (B2) per reactive double bond in the polyisobutene (B1) for a duration of at least 15 minutes to 10 hours and up to 10 bar of positive pressure, wherein the derivatives are selected from the group consisting of anhydrides, mono- or dialkyl esters and mixed esters and wherein the reactive double bonds are the sum total of the terminal α- and β-double bonds in the polyisobutene (B1), and
   C) 0 to 60 wt % of further additives,
   wherein the weight percentages for the components A) to C) sum to 100%.

2. The thermoplastic molding composition according to claim 1, wherein the molding composition is constructed from
   A) 30 to 99.5 wt %,
   B) 0.5 to 25 wt %, and
   C) 0 to 50 wt %.

3. The thermoplastic molding composition according to claim 1 in which the component B) has a bismaleation level of 1% to 20% determined via the saponification number according to DIN 53401: 1988-06.

4. The thermoplastic molding composition according to claim 1, in which the polyisobutene (B1) is an isobutene homopolymer.

5. The thermoplastic molding composition according to claim 1, in which the polyisobutene (B1) is a copolymer obtainable by polymerization of isobutene-containing C4-hydrocarbon streams.

6. The thermoplastic molding composition according to claim 1, in which the proportion of terminal α- and β-double bonds in the polyisobutene (B1) is 30 to 100 mol %.

7. The thermoplastic molding composition according to claim 1 in which the component (B2) is maleic anhydride or di-C1-C4-alkyl maleate.

8. The thermoplastic molding composition according to claim 1 in which the component (B2) is maleic anhydride.

9. The thermoplastic molding composition according to claim 1, wherein the molar ratio of component (B2) to reactive double bond in the polyisobutene (B1) is from 3:1 to 30:1 in the reaction.

10. The thermoplastic molding composition according to claim 1 for use in producing molded articles of any type.

11. A molded article obtained from the thermoplastic molding composition according to claim 1.

\* \* \* \* \*